US009288730B2

(12) United States Patent  
Al-Shalash

(10) Patent No.: US 9,288,730 B2  
(45) Date of Patent: Mar. 15, 2016

(54) MULTI-HOMED MOBILE RELAY

(71) Applicant: Mazin Al-Shalash, Frisco, TX (US)

(72) Inventor: Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 245 days.

(21) Appl. No.: 13/752,113

(22) Filed: Jan. 28, 2013

(65) Prior Publication Data

US 2013/0195005 A1 Aug. 1, 2013

Related U.S. Application Data

(60) Provisional application No. 61/591,770, filed on Jan. 27, 2012.

(51) Int. Cl.
```
H04B 7/14    (2006.01)
H04W 36/16   (2009.01)
H04W 36/18   (2009.01)
H04W 84/00   (2009.01)
H04W 84/04   (2009.01)
```
(52) U.S. Cl.
CPC .............. *H04W 36/16* (2013.01); *H04W 36/18* (2013.01); *H04W 84/005* (2013.01); *H04W 84/047* (2013.01)

(58) Field of Classification Search
CPC .................................................... H04W 80/04
USPC ........................................................ 370/315
See application file for complete search history.

(56) References Cited

U.S. PATENT DOCUMENTS

| 2005/0048974 A1* | 3/2005 | Kim et al. ...................... 455/436 |
| 2005/0250502 A1* | 11/2005 | Laroia et al. .................. 455/447 |
| 2007/0249347 A1* | 10/2007 | Saifullah et al. .............. 455/436 |
| 2011/0002304 A1* | 1/2011 | Lee et al. ....................... 370/331 |

OTHER PUBLICATIONS

"Discussion on Mobile Relay Scenarios and Solutions", CMCC, 3GPP TSG-RAN WG3 #73bis, Oct. 10-14, 2011, p. 1-4.
"Consideration on High Speed Train Scenario", Huawei, 3GPP TSG-RAN WG3 Meeting #74, Nov. 14-18, 2011, 4 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 v10.5.0 (Sep. 2011), 194 pages.

(Continued)

*Primary Examiner* — Samina Choudhry  
(74) *Attorney, Agent, or Firm* — Robert D. McCutcheon

(57) ABSTRACT

A mobile relay node having communication sessions with a plurality of wireless mobile device (UEs) and a communication link to a source base station via a first communication link is located within a moving vehicle. As the vehicle moves from the coverage area of the source base station to the coverage area of a target base station, the relay node performs a hand off process that initiates a second communication link with the target while maintaining and continuing to relay communications between the UEs and the source. Once the second communication link is active, the relay node switches UE traffic from the source base station to the target base station over the second communication link, and then releases the first communication link.

10 Claims, 16 Drawing Sheets

(56) References Cited

OTHER PUBLICATIONS

International Search Report dated May 9, 2013 in connection with International Patent Application No. PCT/US13/23473.

Written Opinion of the International Searching Authority dated May 9, 2013 in connection with International Patent Application No. PCT/US13/23473.

* cited by examiner

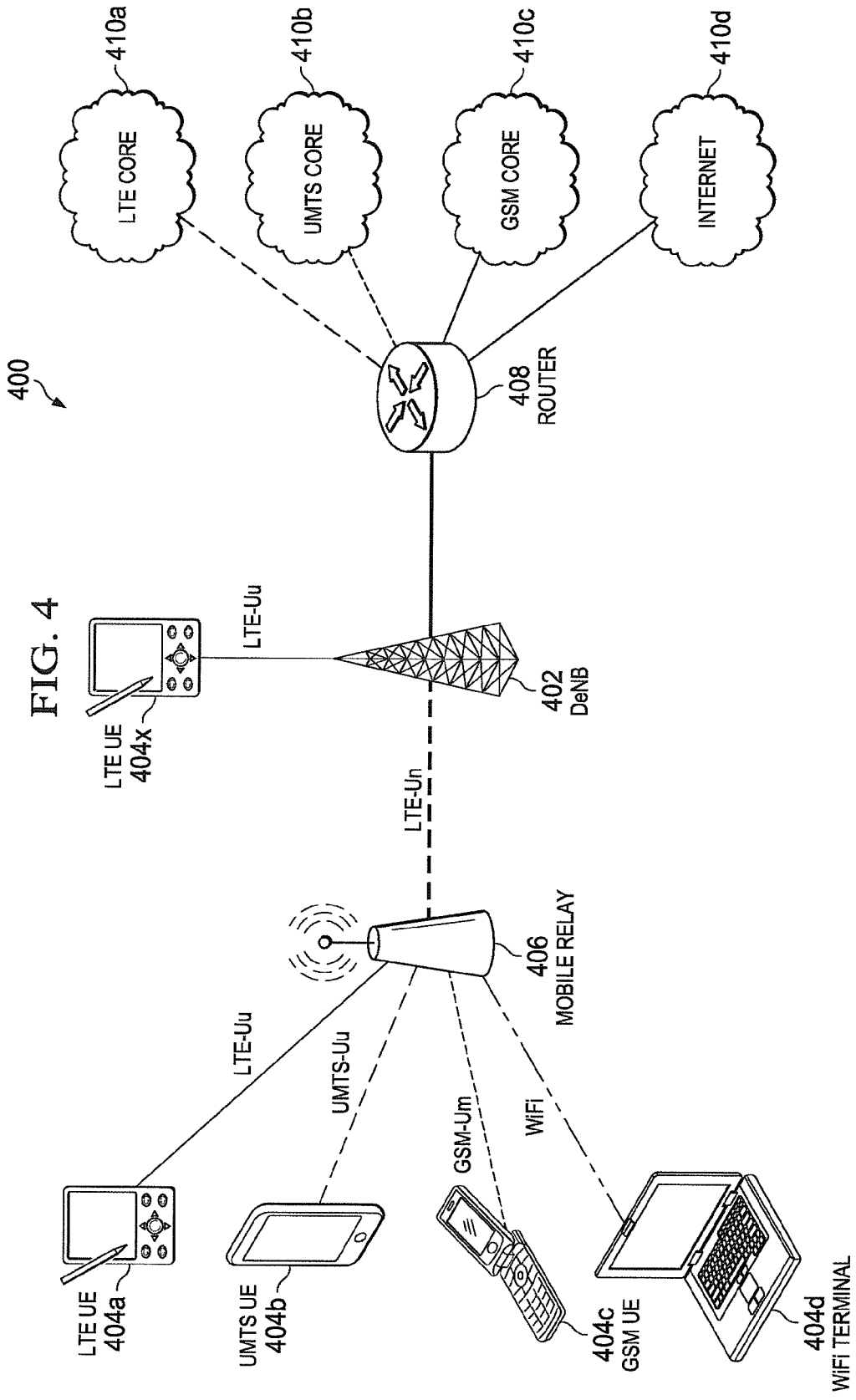

MULTI-HOMED MOBILE RELAY

CROSS-REFERENCE TO RELATED APPLICATION

This application claims priority under 35 U.S.C. 119(e) to U.S. provisional Application Ser. No. 61/591,770, filed on Jan. 27, 2012, and which is incorporated herein by reference.

TECHNICAL FIELD

The present invention relates generally to wireless communication systems, and more particularly to a wireless network architecture and method utilizing mobile relay nodes (mRM) for user equipment (UE) operating in fast moving environments.

BACKGROUND

Over the past years, various telecommunication networks have developed that are based on different communication standards or protocols (e.g., CDMA, UMTS, GSM, etc.). Recently, the concept of utilizing relay nodes to provide another layer of access points for communication with base stations (or base nodes) is gaining some attention. Such relay nodes are located at fixed points within the networks. The present disclosure is directed to relay nodes, regardless of the communication standard or protocol that is deployed in the telecommunications network. However, for ease of understanding, the present disclosure is being described with reference to a particular type of network.

The $3^{rd}$ Generation Partnership Project (3GPP) has characterized a Long Term Evolution (LTE) upgrade for mobile networks. Within the LTE specification, the radio access interface and network is typically known as the Evolved UMTS Terrestrial Radio Access (E-UTRA). E-UTRA is sometimes also referred to as E-UTRAN. For further information on the E-UTRA standard and an overall description, reference is made to 3GPP Technical Specification (TS) 36.300 V10.5.0 (2011-09) (Release 10), which is incorporated herein by reference.

E-UTRA is intended to replace UMTS, HSDPA and HSUPA technologies and is different and incompatible with W-CDMA. This standard provides higher data rates, lower latency and is designed for packet data. This will allow network operators to provide voice, high-speed interactive applications, large data transfer and feature-rich IPTV with mobility. E-UTRA (and LTE) has been designed to be a single evolution for the current GSM/EDGE, UMTS/HSPA, CDMA2000/EV-DO and TD-SCDMA radio interfaces.

With reference to FIG. 1, there is illustrated the typical E-UTRA network architecture and a portion of the evolved packet core (EPC). The E-UTRA network includes the deployment of evolved Node Bs (eNodeB or eNB). eNodeBs perform functions similar to the separate NodeBs and radio network controllers (RNCs) used in the UTRAN, while the NodeB is a term used in UMTS networks as an entity that is functionally equivalent to base transceiver stations (BTS) used in GSM.

As shown in FIG. 1, a current architecture and system 100 includes a plurality of eNodeBs (i.e., access points) 102 and a plurality of mobile management entity/service gateways (MME/S-GW) 104. As will be appreciated, the MME/S-GWs 104 form part of the EPC, and the MME and S-GW entities may be integrated or separate. The MME entity is responsible for signaling (control plane) while the S-GW entity is responsible for data (user or data plane). eNodeBs 102 may be interconnected with each other through an X2 interface, while each eNodeB 102 is connected with one or more MME/S-GWs 104 through an S1 interface. The system 100 includes a number of wireless terminal communication devices (referred to as user equipment or UEs) 110, which may include wireless mobile phones, PDAs, tables, computers, etc. As shown, UE 110a is in wireless communication with one eNodeB 102, while UEs 110b, 110c are in wireless communication with another eNodeB 102.

Though not shown, the EPC includes additional entities or devices, including a PDN gateway (P-GW), which is connected to an external packet data network (e.g., the Internet). The P-GW entity is also responsible for managing the data stream (known as the user plane or data plane). Though only three eNodeBs 102 and two MME/S-GWs 104 are shown, more or less may make up the system 100.

Within the E-UTRA (Release 10), there is provided a "relay node" (RN) concept which supports the inclusion of relay nodes (RNs) wirelessly connected to the eNodeBs 102. FIG. 2 illustrates the E-UTRA system with an RN 106 and a donor eNodeB (DeNodeB) 108. In this network configuration, the UE 110a is in wireless communication with one eNodeB 102, while UEs 110b, 110c are in wireless communication with the RN 106. Those eNodeBs that are wirelessly connected to a relay node (RN) are referred to as "donor" eNodeBs (DeNodeB). The interface between the RN 106 and a DeNodeB 108 is referred to a Un interface. As will be appreciated, the RN 106 functions to terminate the radio protocols of the E-UTRA air interface (with the UEs 110b, 110c) and provide/terminate the S1 and X2 interfaces. Though only one RN 106 and one DeNodeB 108 are shown, the system 100 may include multiple RNs and DeNodeBs. For additional technical information on the E-UTRA and E-UTRAN, reference is made to the technical specification "3GPP TS 36.300 V10.5.0 (2011-09)".

However, these RNs were targeted and functionally limited as stationary—which means the relay nodes were designed in the system to be fixed (i.e., not mobile). As such an RN's DeNodeB was not expected to change during RN operation.

It has been determined that in high speed mobile scenarios, e.g., when the UEs are moving relatively fast, such as aboard a moving passenger train, it is extremely difficult to utilize the typical eNodeB network configuration along the UEs' path. Several problems exist in such a high speed train scenario —large number of UEs concentrated in a small space (causing high traffic load), high speed (causing many hand offs per second and performance degradation due to high Doppler shift of the radio signal), and high penetration loss of the radio signal through well-shielded train cars (carriages) leading to poor coverage within the train.

With reference to FIG. 3A, there is shown a typical diagrammatic system 300 into which the present disclosure may be incorporated and advantageous. The system 300 includes a moving vehicle (or object) 302 depicted traveling from left to right along a roadway or track (or path) 304. Also shown in system 300 are two eNodeBs 102a, 102b (eNB1, eNB2) spaced and positioned along the path 304 which are configured and operable to provide wireless communication functionality and wireless communication links with one or more wireless access devices 306 (only one shown) located aboard the moving vehicle 302. As shown, each eNodeB 102a, 102b has a predetermined coverage area depicted in FIG. 3A with dotted lines. As will be appreciated, the wireless access device 306 is affixed to the moving vehicle 302.

In the example shown in FIG. 3A, the moving vehicle is a high-speed train shown with three passenger cars or carriages 310. Now referring to FIG. 3B, there is shown a silhouette of one of the passenger carriages 310 showing the wireless access device 306, which includes an antenna 307a and antenna 307b. Also shown in dotted lines is the approximate wireless communication coverage area within the passenger carriage 310. It will be understood that each carriage 310 may have one or more access devices 306, and the number of access devices 306 may be fewer, equal to or greater than the number of passenger carriages 310 (depending on power, coverage area, etc.).

Within the passenger carriage 310 of FIG. 3B there are shown a plurality of wireless mobile devices 312 configured and operable for wirelessly communicating with the access device(s) 306. The wireless mobile devices 312 are referred to as UEs (user equipment), and may be the same or similar to the UES 110. These UEs may be mobile phones, smartphones, tablets, wireless computers, etc., and may be any device having wireless communications capabilities.

The inventor has determined that due to the high traffic load, fast handoff and high penetration loss requirements in such a high speed mobile scenario, simply utilizing a high number of eNodeBs along the path is inadequate (and relatively expensive). Another potential solution may include using a radio frequency RF repeater with the land-based eNodeBs. In this solution, though coverage within the vehicle can be improved by amplifying the RF signal, and even Doppler shift problems may be reduced with very sophisticated circuitry, these issues can be compensated for only partially. For example, since the RF repeater only amplifies, filters and then retransmits the received signal, it also amplifies and retransmits any noise received from the environment. In addition, the internal circuitry of the RF repeater adds additional noise to the desired signal. This limits the signal-to-noise ratio that can be achieved within the moving vehicle by using a simple RF repeater, thus limiting the improvement in coverage within the vehicle.

Another potential solution is use of a satellite link for backhaul. This may solve some of the aforementioned problems, but limited bandwidth and long transmission delay of a satellite link will likely create a bottleneck for a large railway with many UEs (which may be prone to consuming more data on a train, than in another type of vehicle). Another problematic issue with a satellite-based relay solution is its vulnerability to coverage obstructions from terrain and man-made clutter (e.g., hills, mountains, tunnels, buildings, etc.)

The inventor has determined, and conceived, that utilization of a "mobile" relay node installed on the train may constitute a potential solution. UEs located within the train would appear relatively stationary relative to the relay node, or at most moving at pedestrian speed as users move through the carriage. As it is not expected that such UEs would need to be handed off to eNodeBs providing coverage outside of the train, until the train stops at a station, no high speed handoffs for these UEs would be required. The only potential handoff of the UEs would be between one relay node and another relay node providing coverage within a carriage, or in two different carriages. Thus, the UEs involved would be very slow moving relative to the RN during the execution of such a handoff.

However, reliance on the currently described RNs (as described in the current Release 10 LTE standard) is not a viable solution. This is because the current RNs are designed to be fixed/stationary (i.e., do not support handoff of the RN from one donor eNodeB to another). Thus continuous service would not be possible with the current RN as the train moved from the coverage of one donor eNodeB to another donor eNodeB along the path.

For mobile UEs, the concept of home eNodeBs and home MME/S-GW is introduced (though not shown specifically in FIG. 1).

The current 3GPP standard (Release 10) introduces the relay node (RN) concept. Herein, we also introduce the terms "RN_UE" and "RN_Cell" to logically and/or physically describe or illustrate various functionality within the network (and to describe various concepts). In particular, the term "RN_UE" is used to denote that logical portion (device/entity) of an RN that appears as a UE (downstream) to a DeNodeB, while the term "RN_Cell" is used to denote that logical portion (device/entity) of the RN that appears as a cell (upstream) to the UEs.

Several problems arise when attempting to reuse the fixed RNs of Release 10 standard to provide support for a "mobile" RN (mRN). First, an RN_UE's S-GW/P-GW is a logical entity co-located within the serving DeNodeB in Rel. 10. Changing the RN_UE's serving DeNodeB requires an RN restart process involving at least reconfiguring the RN_UE's P-GW, IP address, and OAM. Second, the current RN_Cell1 is seen as a cell of the DeNodeB by the EPC. Because the RN_Cell's CGI (Global Cell Id) is associated with the serving eNodeB (i.e., shares the same Global eNodeB ID with the DeNodeB), changing the RN_UE's serving DeNodeB would require changing the RN_Cell's ECGI. Also, the configuration and setup of the RN_Cell1 is performed via OAM, and the accompanying delay resulting from changing the DeNodeB and the configuration of RN may be significant and prevent reliable hand-offs.

Accordingly, there is needed a new "mobile" RN and functionality for use in a wireless network architecture which can support many UEs and engage in fast hand-offs between itself and source and destination serving eNodeBs.

SUMMARY

According to one embodiment, there is provided a multihomed mobile relay node handoff method. The method includes establishing a first communication link between a mobile relay node and a first base station, the mobile relay node fixed to a moving vehicle; establishing a plurality of communication sessions between the mobile relay node and a plurality of UEs proximate the moving vehicle and moving at a substantially same velocity as the moving vehicle; establishing a second communication link between the mobile relay node and a second base station; and performing a hand off of the mobile relay node from the first base station to the second base station when the vehicle moves from a first area to a second area.

In another embodiment, there is provided a mobile relay node for use in a moving vehicle. The mobile relay node includes a processor, memory coupled to the processor, and a transceiver coupled to the processor. The mobile relay node is configured to: establish a first communication link with a first base station, establish a plurality of communication sessions with a plurality of UEs disposed about the moving vehicle and moving at a substantially same velocity as the moving vehicle, transmit data received over the plurality of communications sessions over the first communications link, establish a second communication link with a second base station, and handoff the mobile relay node from the first base station to the second base station when the vehicle moves from a first area to a second area, and thereafter transmit data received over the plurality of communication sessions over the second communications link.

In yet another embodiment, there is provided a handoff method for use in a wireless communications network. The method includes establishing a first communication link between a mobile relay node and a source donor evolved NodeB (DeNB) device, the mobile relay node fixed to a moving vehicle. A plurality of communication sessions are established between the mobile relay node and a plurality of wireless devices proximate the moving vehicle and moving at a substantially same velocity as the moving vehicle. The method further includes establishing a second communication link between the mobile relay node and a second base station, and performing a hand off of the mobile relay node from the first base station to the second base station when the vehicle moves from a first area to a second area.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 4 depicts an example communications network architecture or system 400 including a mobile relay node in accordance with the present disclosure;

DETAILED DESCRIPTION

Figure 1:
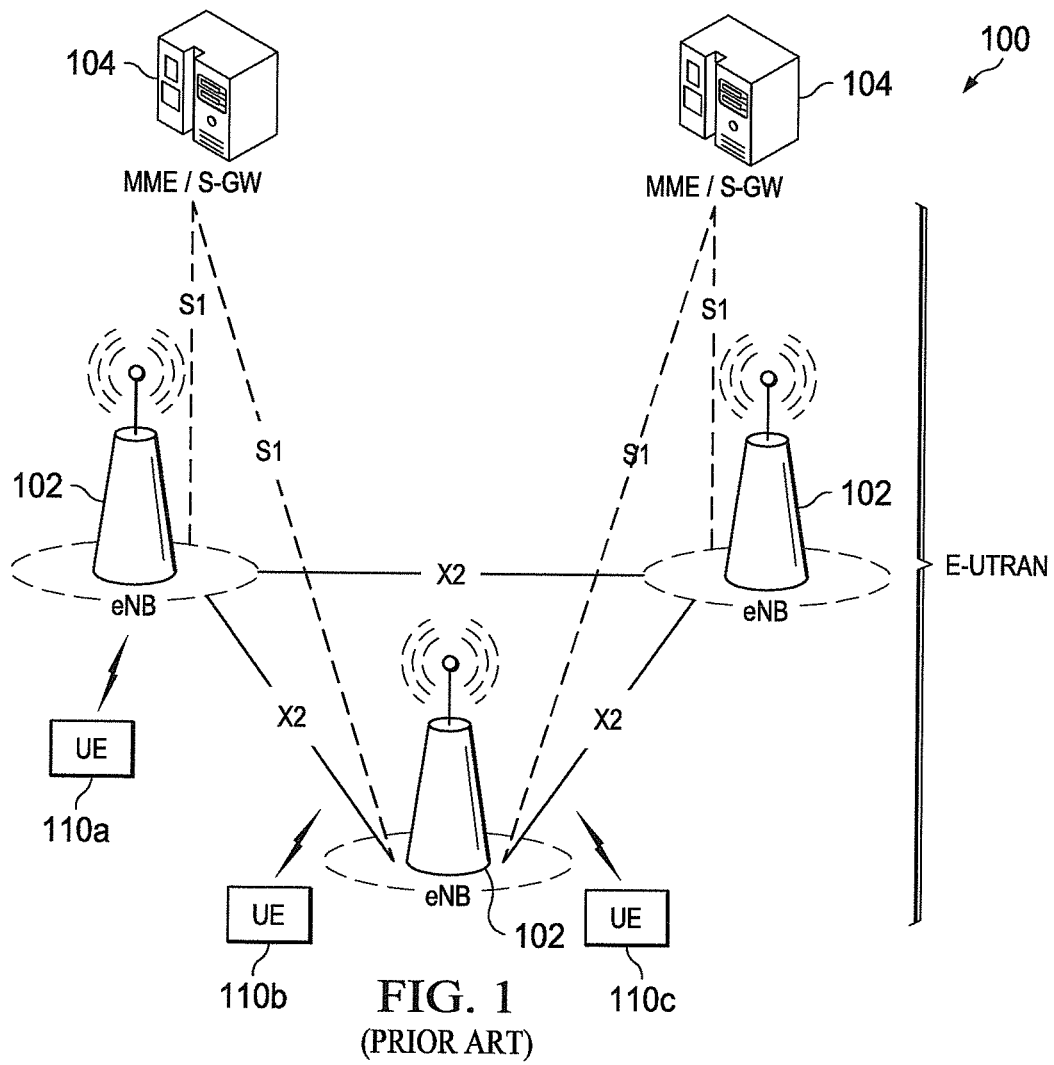
FIG. 1 depicts a high level diagram of the current E-UTRA network according to the 3GGP LTE standard.
Figure 2:
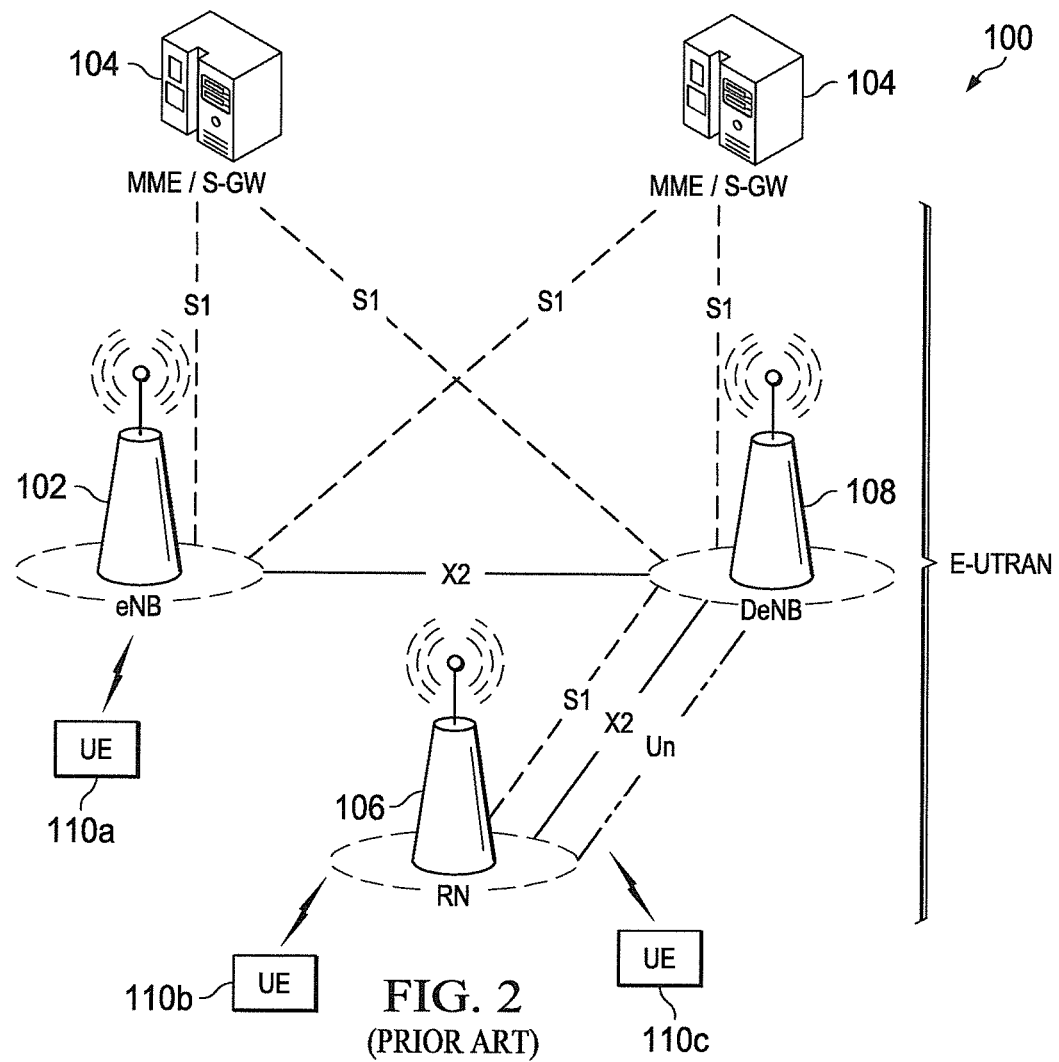
FIG. 2 depicts a high level diagram of the E-UTRA network in FIG. 1 including a relay node and a donor eNodeB.
Figure 3A:
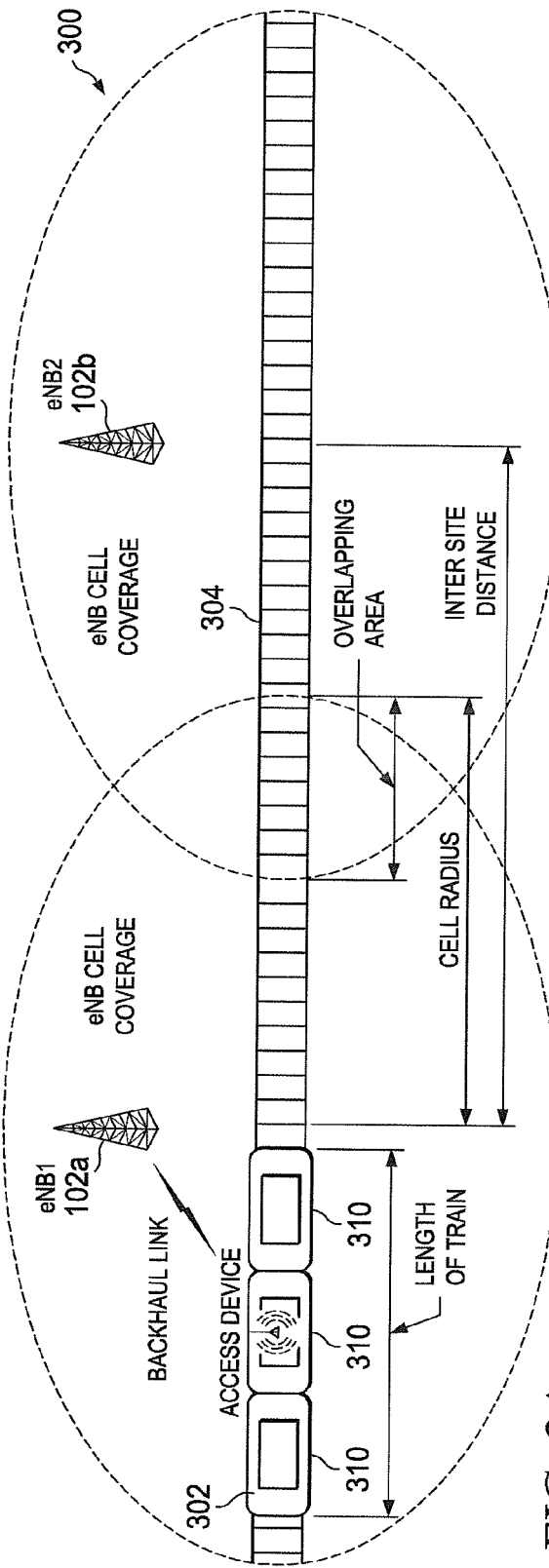
FIG. 3A depicts an example diagrammatic wireless communication system and application in which the present disclosure may be incorporated and advantageously utilized.
Figure 3B:
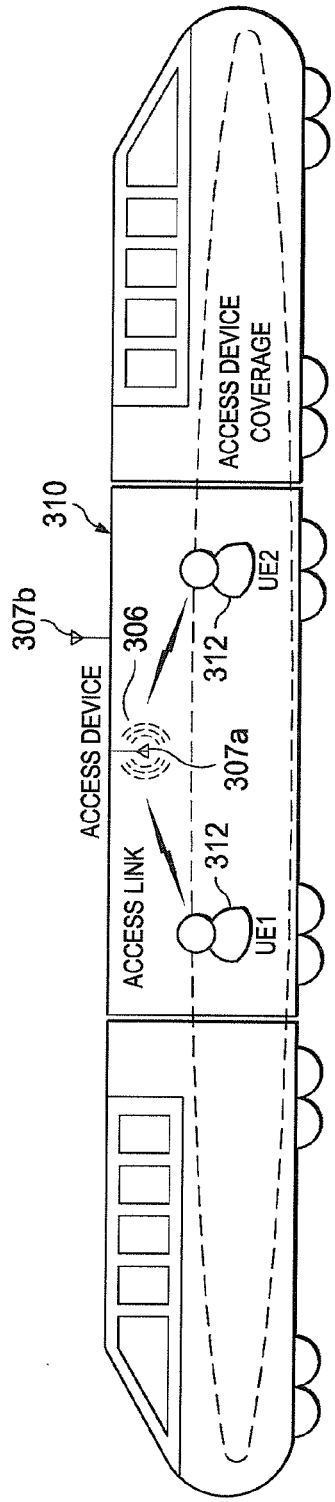
FIG. 3B illustrates a local wireless network within a passenger car of a train within the system shown in FIG. 3A.

FIG. 4 illustrates an example communications network architecture or system 400 in accordance with the present disclosure. The system or network 400 shown in FIG. 4 is for illustration purposes only. Other embodiments of the system 100 may be used without departing from the scope of this disclosure. Reference to "standards" in the following text is meant to encompass existing and future versions of the referenced standards, as well as standards encompassing the principles of the subject matter disclosed and claimed herein.

In this example, the system 400 is part of a larger access services network (not shown), and the system 400 includes a number of wireless terminal communication devices (referred to as UEs) 404. The UEs 404 may include wireless mobile phones, PDAs, tables, computers, etc. The system 400 also includes one or more donor eNodeBs (DeNodeB) 402 and one or more mobile relay nodes (mRN) 406 communicating wirelessly with the plurality of UEs 404. The system 400 may include additional DeNodeBs 402, UEs 404 and mRNs 406, and may also include other network devices, such as other eNodeBs.

As shown in FIG. 4, the UEs 404a, 404b, 404c, 404d communicate through wireless communications links with the mRN 406 (via antenna 407a) while a UE 404x is shown communicating through a wireless communication link with the DeNodeB 402. The UEs 404 may communicate with the mRN 406 through one or more wireless communication standards or protocols, such as LTE (UE 404a), UMTS (UE 404b), GSM (UE 404c), WiFi (UE 404d), etc., while the UE 404x communicates with the DeNodeB 402 using the LTE standard or protocol.

Upstream, the mRN 406 communicates wirelessly with the DeNodeB 402 (via antenna 407b) in accordance with LTE. In the example shown, the mRN 406 includes radio access translation (RAT) functionality which enables the mRN 406 to communicate with UEs operating in accordance with standards or protocols different from LTE. With this functionality, a portion of the communication traffic on the other side of the mRN 406 may occur in accordance with LTE.

Wireless or wireline communications occur between the DeNodeB 402 and a data packet router 408. Similar to the mRN 406, the router 408 may include translation functionality which enables the router to communicate with the LTE core network 410a, the UMTS core network 410b, the GSM core network 410c and the internet 410d. Thus, the mRN 406, the DeNodeB, and the router 408 may be used to carry not only LTE traffic, but may also carry data from UEs operating in accordance with UMTS, GSM, internet, etc.

Figure 5A:
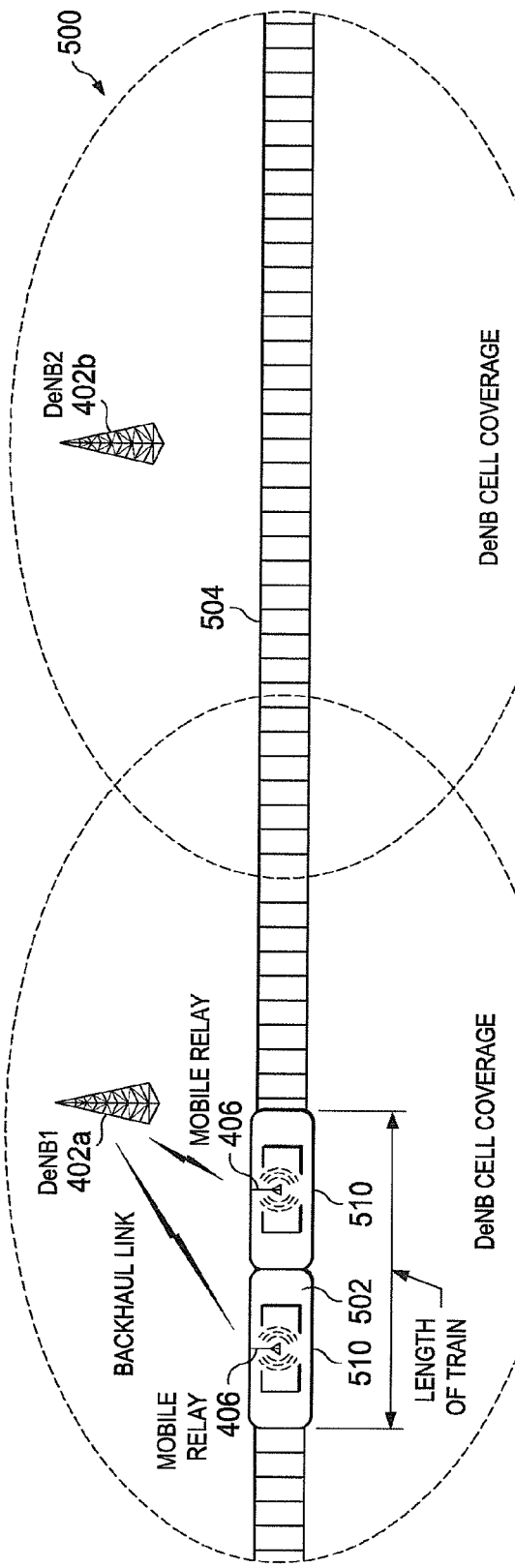
FIG. 5A depicts a wireless communication system and application having a mobile relay node in accordance with the present disclosure.

With reference to FIG. 5A, there is shown an example system 500 in which a portion of the system 400 may be incorporated. The system 500 includes a moving vehicle 502 depicted traveling from left to right along a roadway or track (or path) 504. Also shown in system 500 are two DeNodeBs 402a, 402b (DeNB1, DeNB2) spaced and positioned along the path 504 which are configured and operable to provide wireless communication functionality and wireless communication link(s) with one or more mobile relay nodes (mRN) 406 located aboard the moving vehicle 502. As shown, each DeNodeB 402a, 402b has a predetermined coverage area depicted in FIG. 5A with dotted lines. As will be appreciated, the mRNs 406 are fixed relative to the moving vehicle 502, but are moving relative to the DeNodeBs 402a, 402b.

Figure 5B:
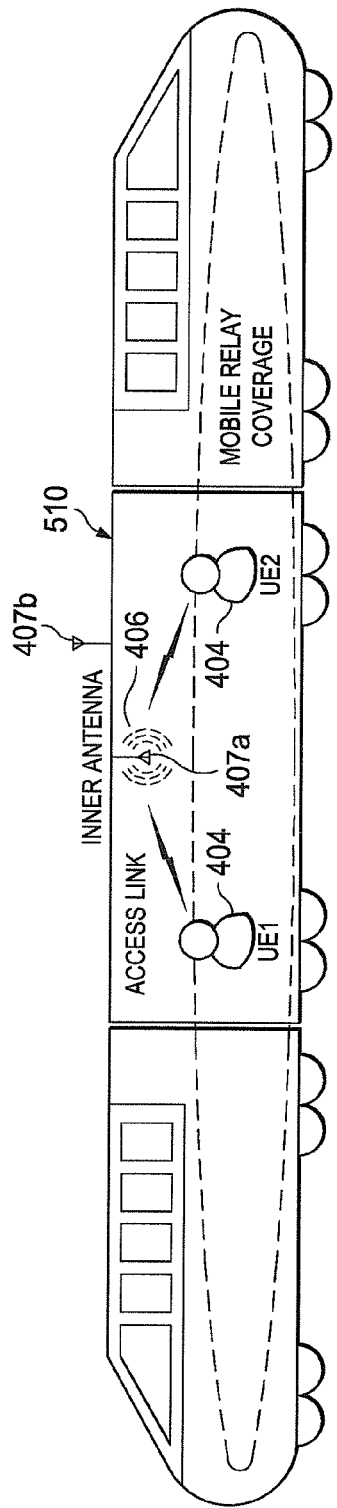
FIG. 5B illustrates a local wireless network within a passenger car of a train within the system shown in FIG. 5A.

In the example shown in FIG. 5A, the moving vehicle 502 is a high-speed train shown with two passenger cars or carriages 510. Now referring to FIG. 5B, there is shown a silhouette of one of the passenger carriages 510 showing the mRN 406. Also shown in dotted lines is the approximate wireless communication coverage area within the passenger carriage 510. It will be understood that each carriage 510 may have one or more mRNs 406, and the number of mRNs 406 may be fewer, equal to or greater than the number of passenger carriages 510 (depending on power, coverage area, etc.).

Other components, devices or networks may be included in the system 400, and FIG. 4 only illustrates but one exemplary configuration to assist in describing the system and operation to those skilled in the art. The system represented in FIG. 4 may be described using different nomenclature or system terminology, such as use of the terms access terminal (AT) or mobile subscriber terminals (MS or MT), base station or base transceiver station (BTS), and the use of any given nomenclature to describe a device within the system 100 is not intended to limit the scope of this disclosure.

The structure and functionality of conventional relay nodes, eNodeBs and DeNodeBs are generally well-known. These devices generally include various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of these devices, other than as noted herein or relevant for an understanding of the present disclosure, is provided, as these are known to those of ordinary skill in the art. It will be understood that the mRN 406 and the DeNodeBs 402a, 402b (and eNodeBs) may be constructed or configured from any suitable hardware, software, firmware, or combination thereof for providing the functionality known to those of ordinary skill in the art. The mRN 406 and the DeNodeBs 402a, 402b will include additional functionality as described below in accordance with one or more embodiments.

The UEs 404 represent devices utilized by a user or subscriber during communication sessions over/within the system 400. Each UE 404 typically includes a processor, memory, a transceiver and an antenna and may be constructed or configured from any suitable hardware, software, firmware, or combination thereof for transmitting or receiving information over a network. These devices may further include an input/output device having a microphone and speaker to capture and play audio information, as well as a camera and/or a display to capture/display video information. As an example, each UE 404 may be a telephone, videophone, computer, personal digital assistant, mobile phone, smartphone, tablet, or the like, etc.

In general terms, the present disclosure describes the use of one or more "mobile" relay nodes located on or affixed to a moving vehicle which function as access points for UEs that are also moving along with the moving vehicle. For example, the moving vehicle may be a train, bus, airplane or other vehicle that typically transports a large number of persons across a distance. The use of mobile RNs is intended and designed for moving vehicles generally having a speed of about 50 km/hr or faster, and more particularly for vehicles moving at a speed of about 100 km/hr or faster, and more particularly for trains exceeding 200 km/hr.

In operation, and using a train as an example, the UEs located aboard a moving train engage in communication sessions with the mobile relay node(s). The mobile relay node(s) communicate wirelessly with DeNodeBs located along the path of the train. As the train moves, the mobile relay node(s) engage in hand offs as the train travels into and out of coverage areas of respective DeNodeBs.

It will be understood that the UEs 404 are moving substantially the same velocity (and direction) as the mRN 406, and the mRN 406 is moving substantially the same velocity as the moving vehicle 502. In other words, the position of the mRN 406 is fixed relative to the position of the moving vehicle or vehicle 502. Also, the mRN 406 is moving relative to the DeNodeBs in the system.

Analogous to that described previously, the term "RN_UE" is used to denote that logical portion (device/entity) of the RN 406 that appears as a UE (downstream) to the DeNodeB 402, while the term "RN_Cell" is used to denote that portion (device/entity) of the RN 406 that appears as a cell (upstream) to the UEs 404.

In addition, each RN device 406 may comprise multiple RN_UEs and multiple RN_Cells. These multiple RN_UEs and RN_Cells may be physical in nature, or may be logical instantiations within the operating software environment of a single RN device 406.

An RN_UE (as viewed from the DeNodeBs 402) may be divided into RN_UE1 and RN_UE2 (or more), with each being an instantiation. In this embodiment, a DeNodeB recognizes each instantiation of the relay node (RN_UE1 and RN_UE2) as a separate UE—and communicates with each RN_UE as it were a separate UE device. One way to accomplish this is to assign each of the RN_UEs a different ID.

Similarly, an RN_Cell1 (as viewed from the UEs 404) may be divided into RN_Cell1 and RN_Cell2 (or more), with each being an instantiation. In this embodiment, a UE recognizes each instantiation of the relay node (RN_Cell1 and RN_Cell2) as a separate cell/node—and communicates with the relay node as it were two relay nodes. One way to accomplish this is to assign each of the RN_Cells a different ID.

Figure 7A:
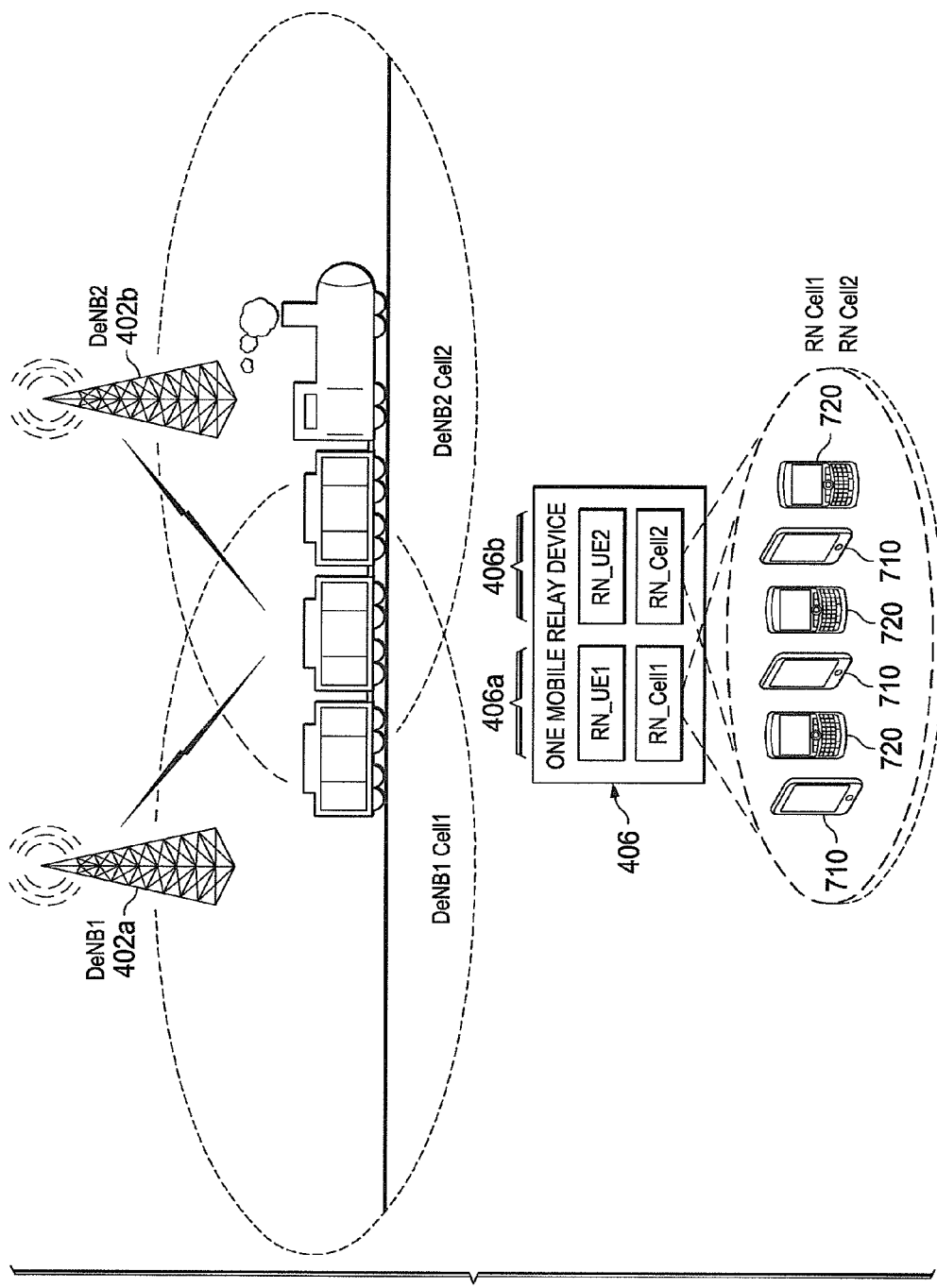
FIG. 7A illustrates one embodiment of the method and mobile relay node in accordance with the present disclosure.

Now turning to FIG. 7A, there is illustrated one embodiment in which the mRN 406 is configured to include RN_UE1, RN_UE2 RN_Cell1 and RN_Cell2. As shown, RN_UE1 is instantiated and configured to communicate with DeNodeB 402a (e.g., mRN 406 is a UE of DeNodeB 402a) while RN_UE2 is instantiated and configured to communicate with the DeNodeB 402b (e.g., mRN 406 is a UE of DeNodeB 402b). Similarly, RN_Cell1 is instantiated and configured to communicate with one group of UEs 710, while RN_Cell2 is instantiated and configured to communicate with one group of UEs 720.

The following describes, in general terms, the process of handing off the mobile relay node (mRN) 406 from the DeNodeB1 402a to the DeNodeB2 402b as the mRN 406 moves from Cell1 to Cell2.

Assuming RN_UE1 of the mRN 406 is already connected (e.g., communications link established) to the DeNodeB1 402a, both groups (all) of the UEs 710, 720 in the vehicle are served by RN_Cell1. When the vehicle moves into the coverage area of the DeNodeB2 402a (e.g., when signal strength reaches a predetermined level), RN_UE2 connects and establishes a communication link to the DeNodeB2 402b. The mRN 406 initiates and hands off both groups (all) of UEs 710, 720 from the RN_Cell1 to the RN_Cell2. Each of these handoffs may be sequentially (individually, or sequentially in small groups), or may be performed as a group HO (substantially simultaneously) to reduce the HO delay and the signaling load.

During this phase, RN_Cell1 and RN_Cell2 will be active and transmit simultaneously. To minimize potential interference between these two RN cells, various techniques may be employed as desired. For example, RN_Cell1 and RN_Cell2 may transmit on different carrier frequencies.

In an alternative embodiment, the RN_Cell1 and RN_Cell2 may have different coverage areas within the vehicle (e.g., train car), and the coverage area of RN_Cell2 may be increased while the coverage area of RN_Cell1 may be shrunk, until all the UEs have been handed off from the RN_Cell1 to the RN_Cell2.

After all of the UEs are connected to RN_Cell2, the RN 406 may disconnect (detach) the RN_UE1 from the DeNodeB1_Cell1 and the S1 connections for RN_Cell1 between the mRN 406 and the EPC, and x2 connections for RN_Cell1 between the mRN 406 and neighboring eNBs, are all released.

As will be appreciated, as the vehicle keeps moving and reaches a DeNodeB3 coverage area Cell3 (not shown), the RN_UE1 connects and establishes a communication link to a DeNodeB3 (not shown). And the handoff process is repeated as described above. Further, in this embodiment, the two RN_UEs (RN_UE1 and RN_UE2) and the two RN_Cells (RN_Cell1 and RN_Cell2) of the mRN 406 work alternatively to support the high speed vehicle scenario. As noted though, more than two such entities may be instantiated within the mRN 406, if desired.

In the embodiment described above, there is no need to relocate the RN_UEs S-GW/P-GW from the DeNodeB 402a to the DeNodeB 402b. As there will be a new RN_UE2 corresponding to the new DeNodeB2 402b following each HO of the mobile RN 406. In addition, the E-UTRAN Cell Global IDs (ECGIs) of the RN_Cells can be defined so as to be compatible with its associated DeNodeB's ID. Therefore, issues relating to routing traffic to the correct DeNodeB should be eliminated or reduced.

As described above, when the mRN 406 moves from the DeNodeB1 402a to the DeNodeB2 402b, multiple handovers will be triggered in order to hand off the served UEs from RN_Cell1 to RN_Cell2. In a high speed vehicle scenario, the HO duration is limited, and therefore, a group HO (all at once, or a few groups sequentially) is beneficial to reduce the latency and signaling load. For backward compatibility, the X2/S1 HO messages between network entities may be further optimized. For example, multiple UE contexts can be included in a single X2/S1 HO message. In this case, the RN 406 can initiate and handover all the served UEs or part of the served UEs by using a single X2/S1 HO message.

Figure 7B:
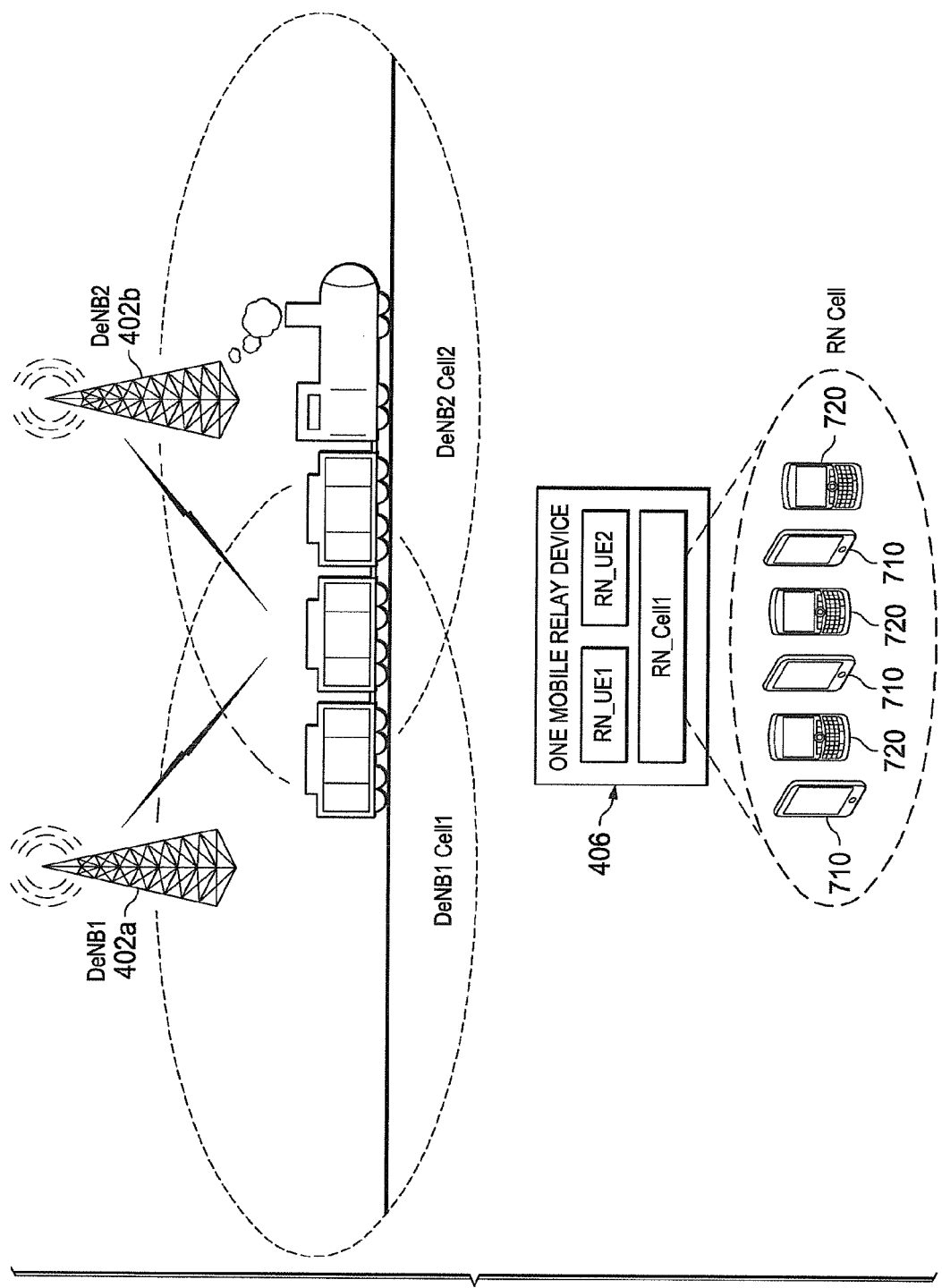
FIG. 7B illustrates another embodiment of the method and mobile relay node in accordance with the present disclosure.

Now turning to FIG. 7B, there is illustrated another embodiment in which the mRN 406 is configured to include RN_UE1, RN_UE2 and a single RN_Cell1 (identified as RN_Cell1). As shown, RN_UE1 is instantiated and configured to communicate with DeNodeB 402a (e.g., mRN 406 is a UE of DeNodeB 402a) while RN_UE2 is instantiated and configured to communicate with the DeNodeB 402b (e.g., mRN 406 is a UE of DeNodeB 402b). As will be understood, the mRN is configured with two RN_UE entities but only a single RN_Cell1 entity. The RN_Cell1 serves and communicate with all of the UEs (both groups of UEs 710, 720).

The following describes, in general terms, the process of handing off the mRN 406 from the DeNodeB1 402a to the DeNodeB2 402b as the mRN 406 moves from Cell1 to Cell2.

Assuming RN_UE1 of the mRN 406 is already connected (e.g., communications link established) to the DeNodeB1 402a, both groups (all) of the UEs 710, 720 in the vehicle are served by RN_Cell1. When the vehicle moves into the coverage area of the DeNodeB2 402a, RN_UE2 connects and establishes a communication link to the DeNodeB2 402b. The mRN 406 then is handed off from the DeNodeB1 402a to the DeNodeB2 402b. As will be appreciated, the UEs 710, 720 need not be aware of the mRN handoff. The mRN 406 switches the UE/mRN communications from the mRN/DeNodeB1 communications path (through RN_UE1) to the mRN/DeNodeB2 communications path (through RN_UE2).

Because the mRN 406 is configured with only a single RN_Cell, the UEs served by the mRN 406 need not be aware of the HO of the mRN 406 from DeNodeB1 402a to the DeNodeB2 402a. Handoff related messages are only exchanged between source and target DeNodeBs, and between DeNBs and EPC nodes (MME/S-GW), and no HO commands are sent to the UEs. According to this embodiment, following handoff of the mRN 406, the E-UTRAN Cell Global ID (ECGI) for the single RN_Cell should be changed to correspond to the ECGI of DeNodeB2 402b.

It will be understood that the embodiments of FIGS. 7A and 7B have different advantages and disadvantages. In the embodiment of FIG. 7B, the mRN 406 is logically/functionally divided into a first "virtual" mRN 406a (e.g., RN_UE1 and RN_Cell1) and a second "virtual" mRN 406b (e.g., RN_UE2 and RN_Cell2). The second virtual mRN is established for connection to the target/destination cell. A mobile relay node partitioned in this manner into multiple "virtual" mRNs (or instantiations) is referred to a "multi-homed" mobile relay node. Thus, the mRN 406 appears as two separate relay nodes (RN_UE1, RN_UE2) to the upstream network.

Once the second connection is made, user traffic is moved or transitioned from the first connection to the second connection. Once all user traffic has been switched to the second connection, the handoff of mRN 406 to the DeNodeB2 402b in the target/destination cell has been completed, and the RN_UE1 connection to DeNodeB1 402a in the source cell is terminated (i.e., the virtual mRN 406a). The EPC connections for the UEs served by the mRN 406 have also been moved from DeNodeB1/RN_UE1 to DeNodeB2/RN_UE2. This process could require appropriate enhancements to the S1 HO procedures and messaging towards the EPC, or enhancements of the X2 HO procedures and messaging between eNBs.

Figure 6A:
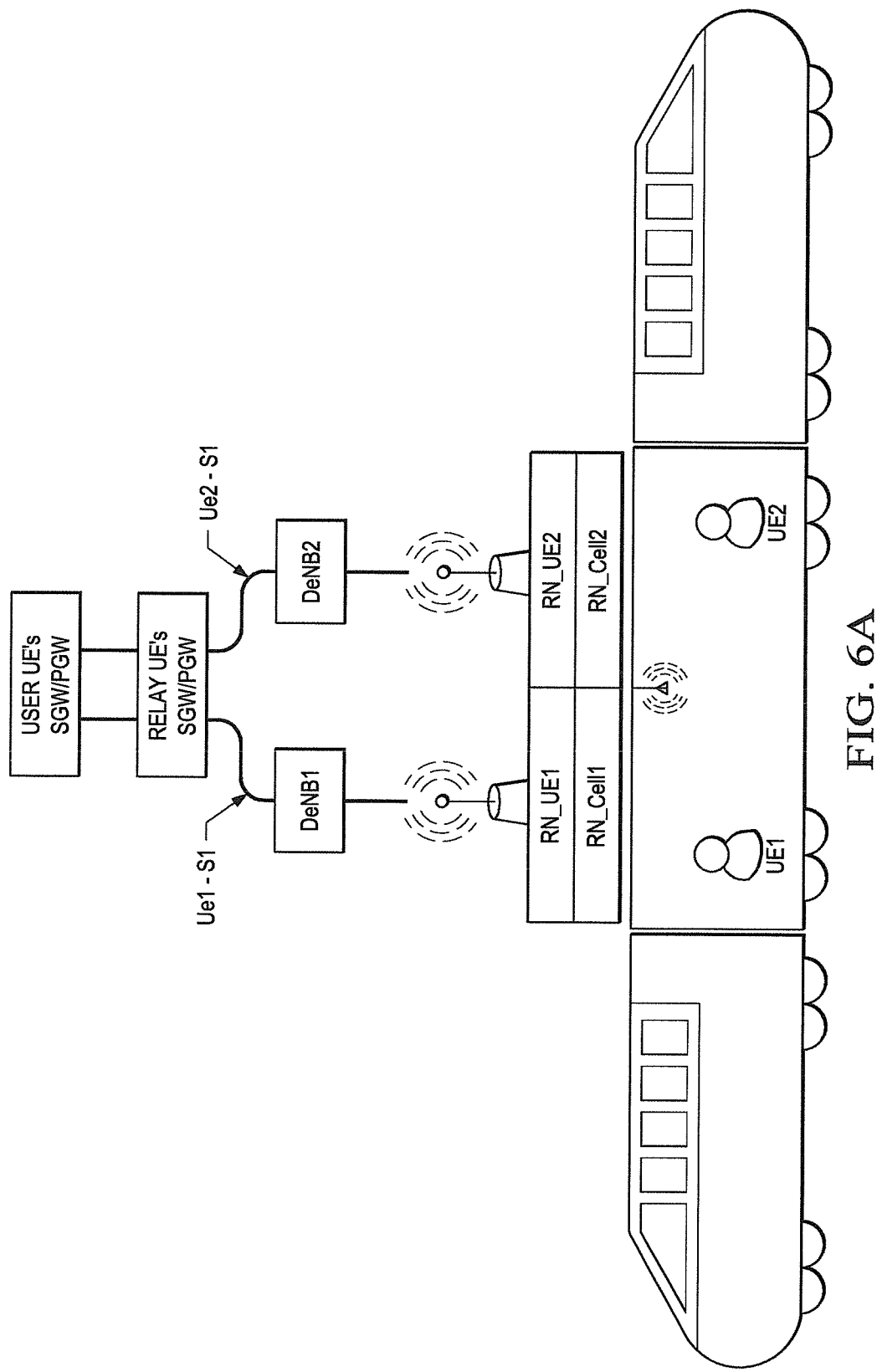
FIGS. 6A and 6B show alternative configurations of the mobile relay node and the DeNodeB in accordance with the present disclosure.
Figure 6B:
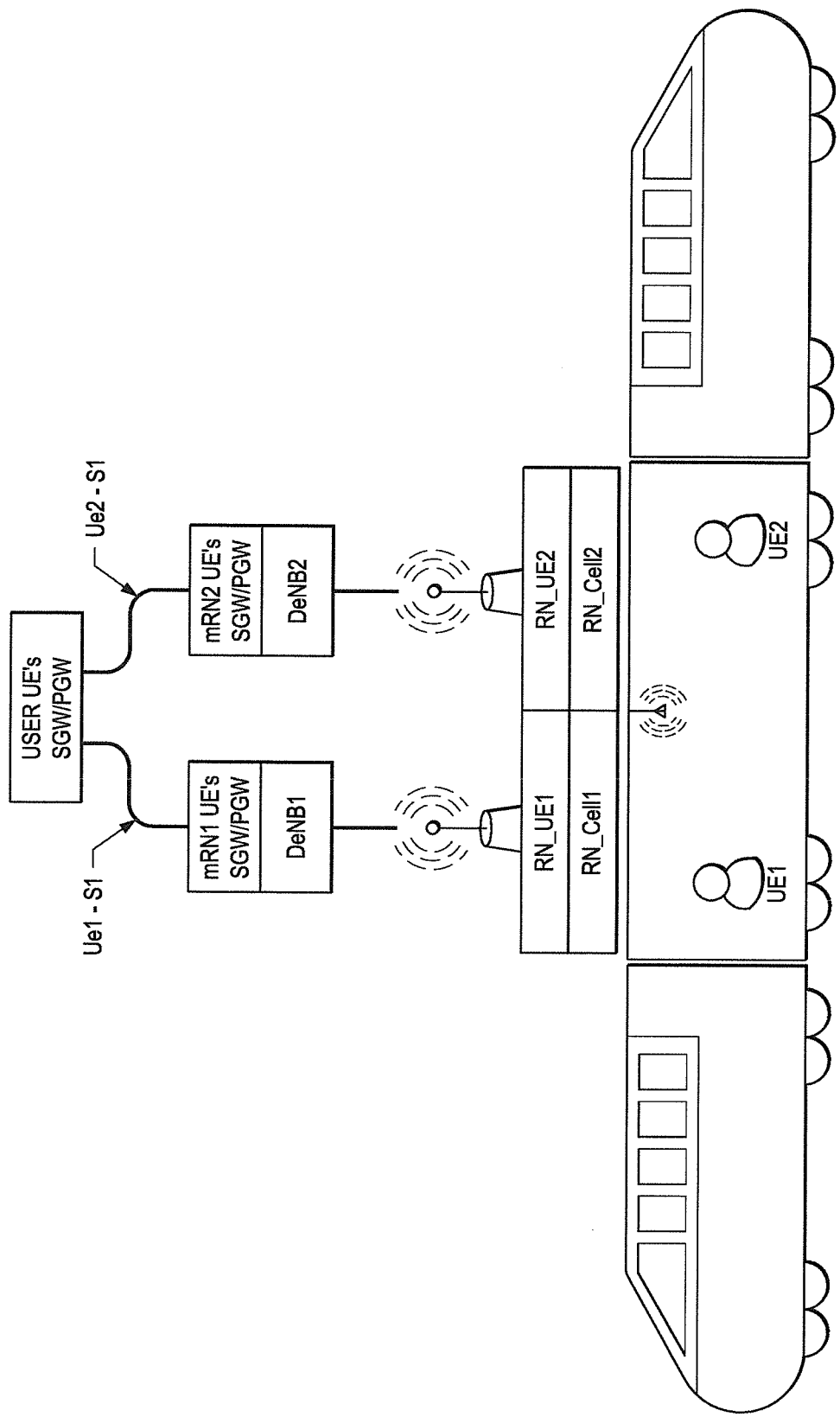

Now turning to FIGS. 6A and 6B, there are illustrated two embodiments illustrating that the teachings and technology described herein is applicable in different network configurations. FIG. 6A illustrates a configuration in which the functionality of the S-GW/P-GWs for the RN_UEs is implemented separate from the DeNodeBs. FIG. 6B illustrates a configuration in which the functionality of the S-GW/P-GWs for the RN_UEs is implemented within the DeNodeBs. As will be appreciated, the configuration shown in FIG. 6B is the standard solution described in the noted Release 10 standard.

Figure 9A:
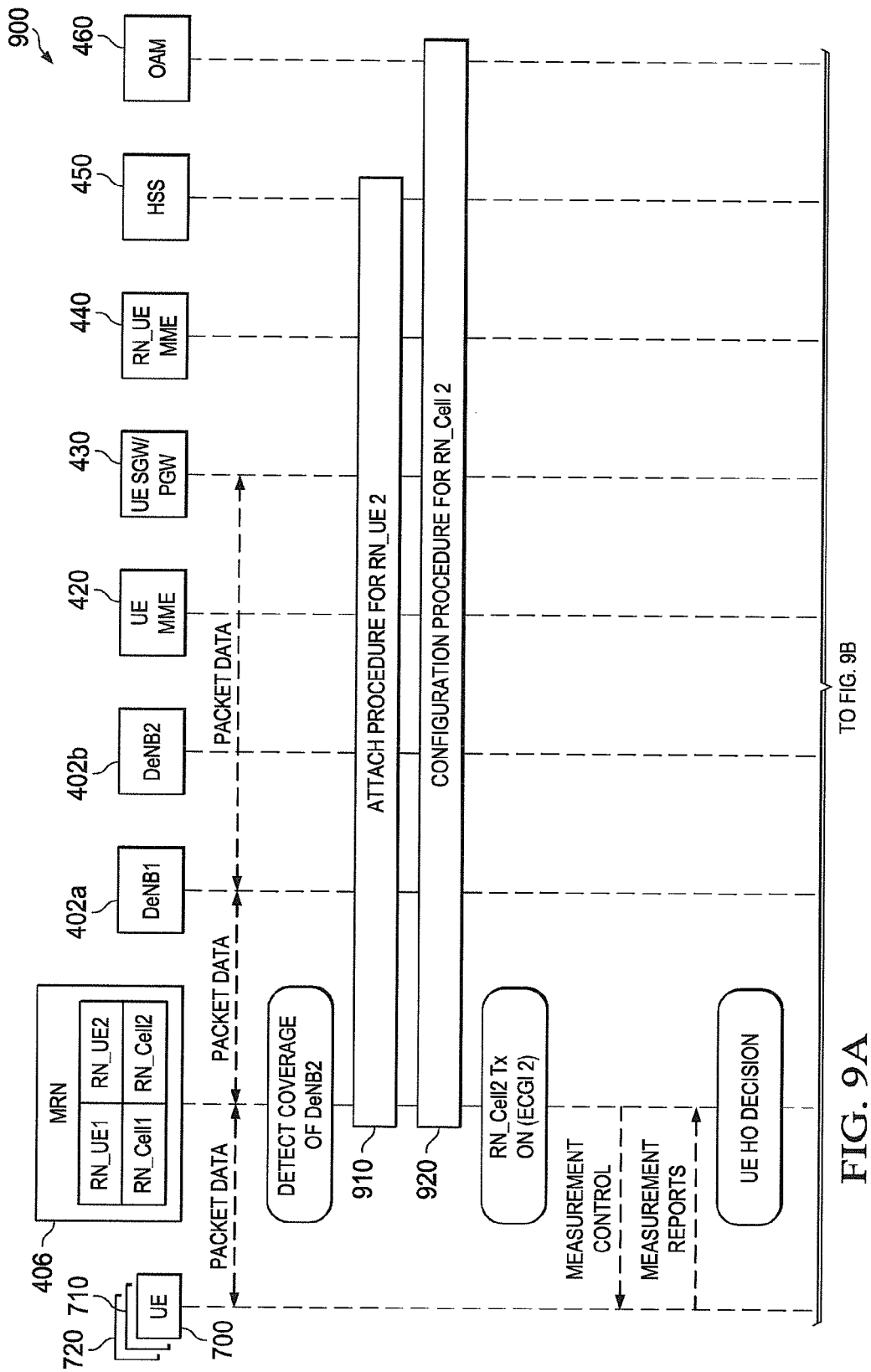
FIGS. 9A, 9B and 9C illustrate a hand off process (in the form of a messaging flow diagram) associated with the embodiment described in FIG. 7A.
Figure 9B:
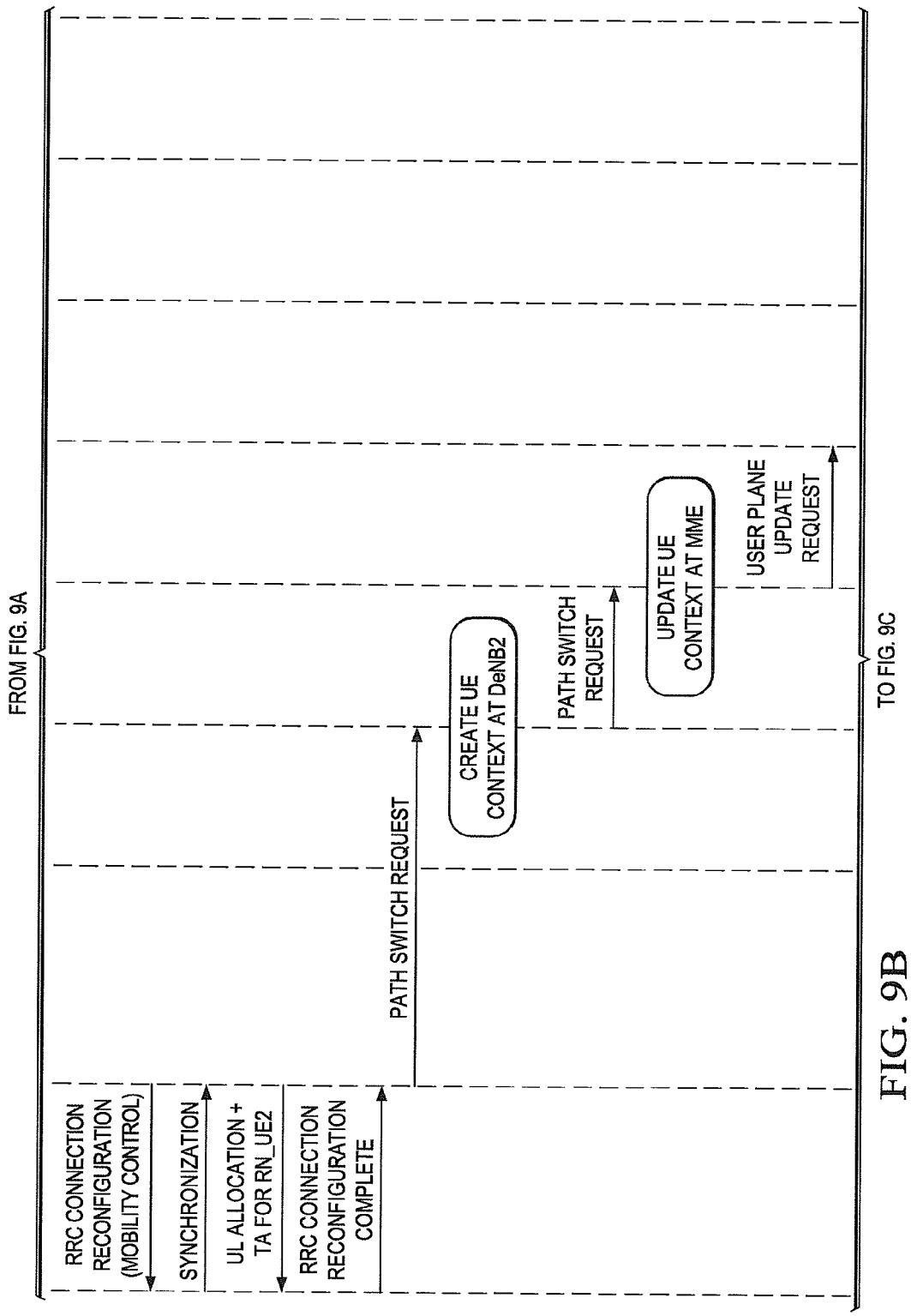
Figure 9C:
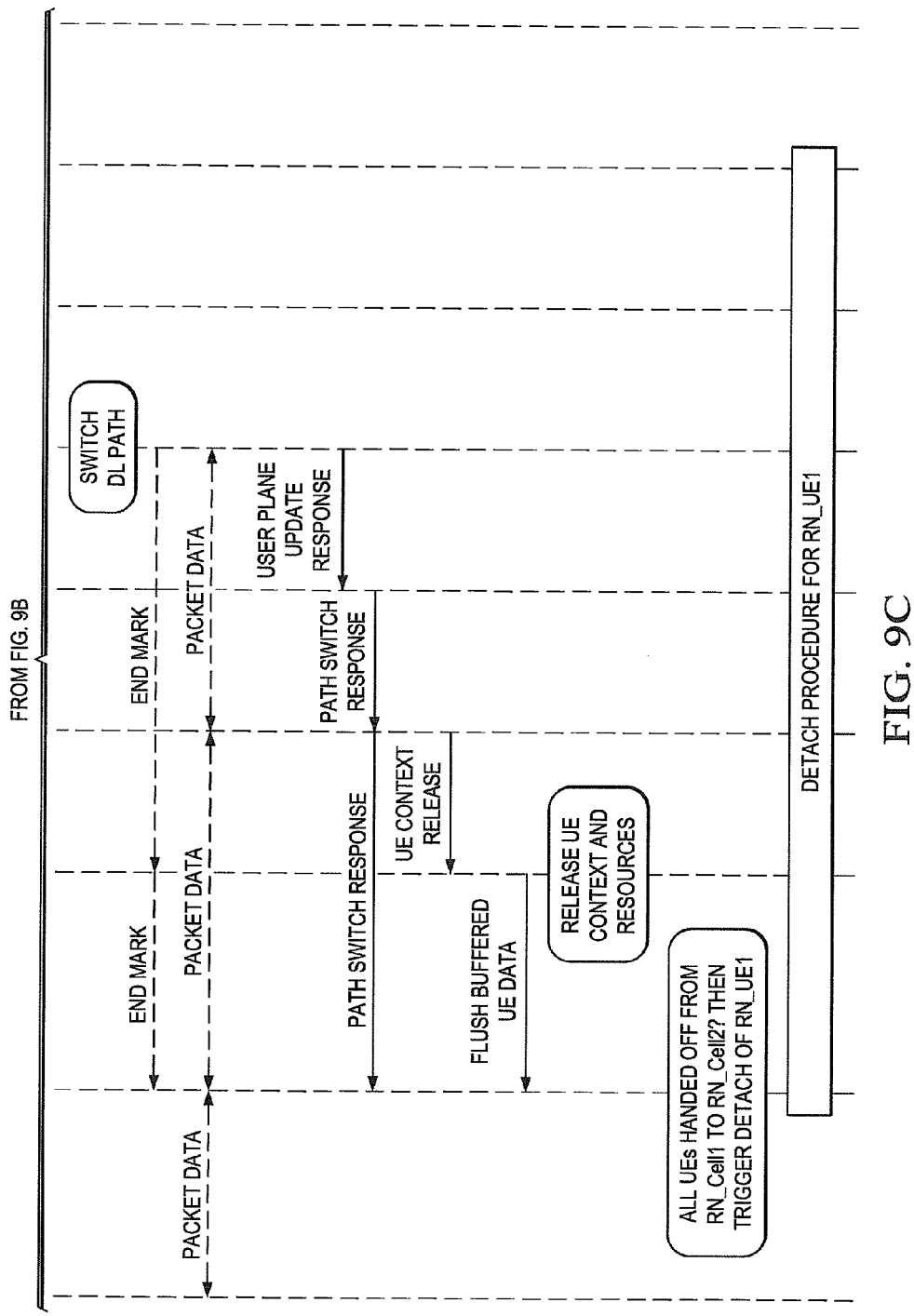

Turning now to FIGS. 9A, 9B and 9C, there is illustrated a hand off process 900 (in the form of a messaging flow diagram) associated with the embodiment described in FIG. 7A. At this point, the UEs 710, 720 are already attached to the network, and packet data is flowing (carried) between the UEs 710, 720 and the DeNodeB1 402a via the virtual mRN 406a (RN_UE1 and RN_Cell1) and between the DeNodeB1 402a and a UE S-GW/P-GW entity 430. It will be understood that the mRN 406 is attached and recognized as a UE (RN_UE1) to the DeNodeB1 402a while the mRN 406 is configured and recognized as a cell station (RN_Cell1) to the UEs 710, 720.

Thus, to establish the initial packet data communications between the UEs 710,720 and the mRN 406 (RN_Cell1) and the DeNodeB 402a, a first communication link between the mRN 406 and the DeNodeB1 402a is established, and a plurality of communication sessions between the mRN 406 and the plurality of UEs 710, 720 proximate the moving vehicle (and moving at a substantially same velocity as the moving vehicle) are established.

As the vehicle 510 moves into the coverage area of the DeNodeB2 402b, the mRN 406 detects the existence of the DeNodeB 402b and determines that it should attach to the DeNodeB2 402b. Any suitable detection and/or determination methods may be implemented or employed by the mRN 406, including for example, detecting DeNodeB2 402b signal strength above a threshold, or detecting that DeNodeB2 402b signal strength is within a certain margin of DeNodeB1 402a signal strength.

The mRN 406 performs an attachment procedure/process 910 and the mRN 406 attaches to the DeNodeB2 402b. In this process, the mRN 406 is attached and recognized as a UE (RN_UE2) to the DeNodeB2 402b. Once attached, the mRN 406 performs a configuration procedure/process 920 and the mRN 406 is configured and recognizable as a potential cell station (RN_Cell2) to the UEs 710, 720. Both the relay node attachment and configuration procedures are illustrated in more detail in FIG. 11 and below.

The RN_Cell2 is assigned an ECGI that is different from the ECGI assigned to the RN_Cell1. The ECGI of RN_Cell2 identifies it towards the EPC as a cell of DeNodeB2 402b, whereas The ECGI of RN_Cell1 identifies it as a cell of DeNodeB1 402a. The RN_Cell2 of the mRN 406 is activated, and transmits control messages/channels (such as synchronization channels) towards the UEs 700, 710. RN_Cell1 of the mRN 406 transmits measurement control messages to the UEs 700, 710, directing these UEs to measure and report the strength of the signal from RN_Cell2. RN_Cell1 of the mRN 406 receives measurement report messages from the UEs. A decision is made by the mRN 406 to handover the UEs from the virtual mRN 406a (RN_Cell1) to the virtual mRN 406b (RN_Cell2). Radio resource control (RRC) connection reconfiguration messages (mobility control) are sent to the UEs 710, 720 from RN_Cell1, and synchronization messages are returned from the UEs to RN_Cell2. The mRN 406 allocates uplink channels and calculates timing advance TA corrections for the UEs for UEs 710, 720 to communicate with RN_Cell2. The uplink channel allocation information and timing advance TA corrections are sent to the UEs 710, 720. With this information, the UEs respond that the RRC connection reconfiguration procedure has been completed on the assigned uplink channel allocated by mRN 406 for communication with RN_Cell2.

Once RRC configuration is implemented for the UEs, the mRN 406 generates and transmits a path switch request to the target DeNodeB2 402b. In response, the target DeNodeB2 402b creates UE contexts for the UEs 710, 720 (whose data paths to the EPC will eventually be switched over to it). The target DeNodeB2 forwards the path switch request to an MME 420 and the MME 420 updates the contexts of the UEs. Next, a user plane update request is generated by the MME and transmitted to the UE S-GW/P-GW entity 430. In response, the UE S-GW/P-GW entity 430 switches the downlink channels/paths of the UEs 710, 720 so that the data downlink channels/paths are now to the target DeNodeB2 402b (instead of the original source DeNodeB1 402a).

Once the downlink data path is switched, end marks are then sent from the UE S-GW/P-GW entity 430 to the DeNodeB1 402a and to the mRN 406. The end marks indicate to DeNodeB1 402a the end of the data stream for a particular UE (in this case UE 710 or 720). Now, the packet data is flowing (carried) between the UEs 710, 720 and the DeNodeB2 402b via the virtual mRN 406b (RN_UE2 and RN_Cell2) and between the DeNodeB2 402b and the UE S-GW/P-GW entity 430.

Once the UE packet data is flowing via the DeNodeB2 402b, a user plane update response message is sent from the UE S-GW/P-GW entity 430 to the MME 420, the MME 420 sends a path switch response message to the DeNodeB2 402b, and the DeNodeB2 402b sends a path switch response message to the mRN 406 (the RN_UE2). These messages verify that the path switch procedure has been successfully completed. The path switch response messages may also complete or update UE context information (for example update logical addressing for the UE's S1 interfaces towards the EPC).

The DeNodeB2 402b generates and transmits a UE context release message to the source DeNodeB1 402a requesting or instructing it to release the contexts for the UEs 710, 720. The DeNodeB1 then flushes any remaining buffered data for UEs 710, 720 to mRN 406. The DeNodeB1 402a releases the UE contexts and any resources allocated to UEs 710, 720.

Once the mRN 406 determines that all UEs 710, 720 have been handed over from the RN_Cell1 to the RN_Cell2, then the mRN 406 performs a detach procedure that detaches or terminates the RN_UE1 connection to the DeNodeB1 402a. In response to this, DeNodeB1 402a releases any resources allocated to RN_UE1 of mRN 406, and releases its UE context.

Figure 10A:
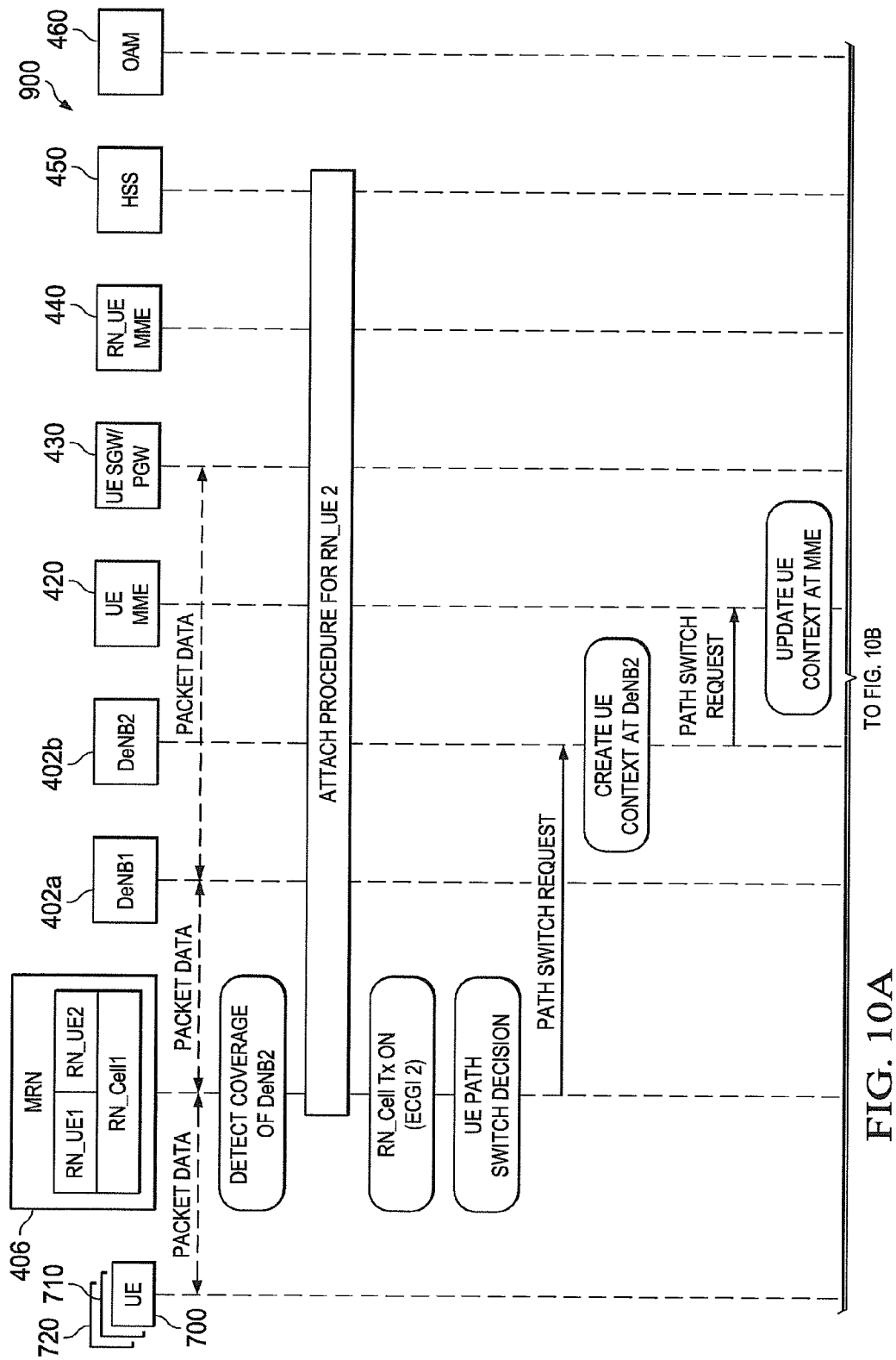
FIGS. 10A and 10B illustrate a hand off process (in the form of a messaging flow diagram) associated with the embodiment described in FIG. 7B.
Figure 10B:
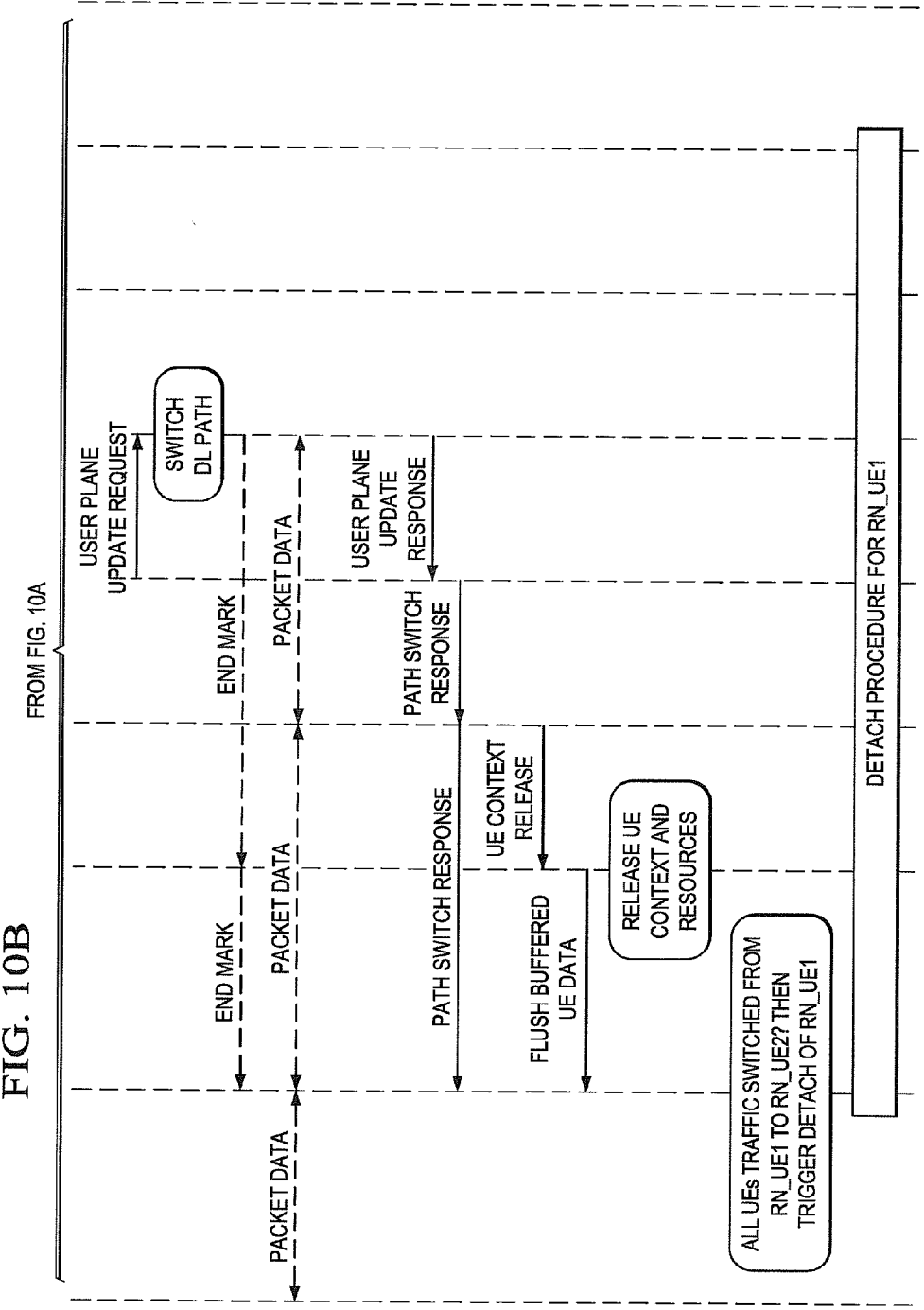

Now turning to FIGS. 10A and 10B, there is illustrated a hand off process 1000 (in the form of a messaging flow diagram) associated with the embodiment described in FIG. 7B. At this point, the UEs 710, 720 are already attached to the network, and packet data is flowing (carried) between the UEs 710, 720 and the DeNodeB1 402a via the virtual mRN 406a (RN_UE1 and RN_Cell1) and between the DeNodeB1 402a and a UE S-GW/P-GW entity 430. It will be understood that the mRN 406 is attached and recognized as a UE (RN_UE1) to the DeNodeB1 402a while the mRN 406 is configured and recognized as a cell station (RN_Cell1) to the UEs 710, 720.

As the vehicle 510 moves into the coverage area of the DeNodeB2 402b, the mRN 406 detects the existence of the DeNodeB 402b and determines that it should attach to the DeNodeB2 402b. Any suitable detection and/or determination methods may be implemented or employed by the mRN 406, including for example, detecting DeNodeB2 402b signal strength above a threshold, or detecting that DeNodeB2 402b signal strength is within a certain margin of DeNodeB1 402a signal strength.

The mRN 406 performs an attachment procedure/process and the mRN 406 attaches to the DeNodeB2 402a. In this process, the mRN 406 is attached and recognized as a UE (RN_UE2) to the DeNodeB2 402b. Note that as RN_Cell1 is already configured, there is no need for an configuration procedure. The relay node attachment procedure is illustrated in more detail in FIG. 11 and below.

Unlike the process 900 illustrated in FIGS. 9A-9C, no RN_Cell2 is created, and no RRC reconfiguration or handover of the UEs 710, 720 from one cell to another cell are needed.

A decision is made by the mRN 406 to "switch" the path of the UE data from RN_UE1 to RN_UE2, and the mRN 406 generates and transmits a path switch request to the target DeNodeB2 402b. In response, the target DeNodeB2 402b creates UE contexts for the UEs 710, 720 (whose data paths to the EPC will eventually be switched over to it). The target DeNodeB2 forwards the path switch request to the MME 420 and the MME 420 updates the contexts of the UEs. Note that in this procedure RN_Cell1 uses a new ECGI in its messages towards the EPC (MME). This new ECGI identifies it towards the EPC as a cell of DeNodeB2 402b. Whereas, RN_Cell1 continues to transmit its old ECGI in certain control messages towards the UEs 710,720. Next, a user plane update request is generated by the MME and transmitted to the UE S-GW/P-GW entity 430. In response, the UE S-GW/P-GW entity 430 switches the downlink channels/paths of the UEs 710, 720 so that the data downlink channels/paths are now to the target DeNodeB2 402b (instead of the original source DeNodeB1 402a).

Once the downlink data path is switched, end marks are then sent from the UE S-GW/P-GW entity 430 to the DeNodeB1 402a and to the mRN 406. The end marks indicate to DeNodeB1 402a the end of the data stream for a particular UE (in this case UE 710 or 720). Now, the packet data is flowing (carried) between the UEs 710, 720 and the DeNodeB2 402b via the RN_UE2 and RN_Cell1 of the mRN 406, and between the DeNodeB2 402b and the UE S-GW/P-GW entity 430.

Once the UE packet data is flowing via the DeNodeB2 402b, a user plane update response message is sent from the UE S-GW/P-GW entity 430 to the MME 420, the MME 420 sends a path switch response message to the DeNodeB2 402b, and the DeNodeB2 402b sends a path switch response message to the mRN 406 (the RN_UE2). These messages verify that the path switch procedure has been successfully completed. The path switch response messages may also complete or update UE context information (for example update logical addressing for the UE's S1 interfaces towards the EPC).

The DeNodeB2 402b generates and transmits a UE context release message to the source DeNodeB1 402a requesting or instructing it to release the contexts for the UEs 710, 720. The DeNodeB1 then flushes any remaining buffered data for UEs 710, 720 to the mRN 406. The DeNodeB1 402a releases the UE contexts and any resources allocated to the UEs 710, 720.

Once the mRN 406 determines that all UE traffic for the UEs 710, 720 (through RN_Cell1) have been switched over from the RN_UE1 to the RN_UE2, then the mRN 406 performs a detach procedure that detaches or terminates the RN_UE1 connection to the DeNodeB1 402a. In response to this, DeNodeB1 402a releases any resources allocated to RN_UE1 of mRN 406, and releases its UE context. Once RN_UE1 has detached from DeNodeB1 402a, then RN_Cell1 changes the ECGI it transmits in certain control messages towards UEs 710, 720 to the new ECGI corresponding to DeNodeB2 402b. Note that this has no impact on UEs 710, 720, as the ECGI is an EPC identifier, and is not used by the UE in mobility procedures.

Figure 11:
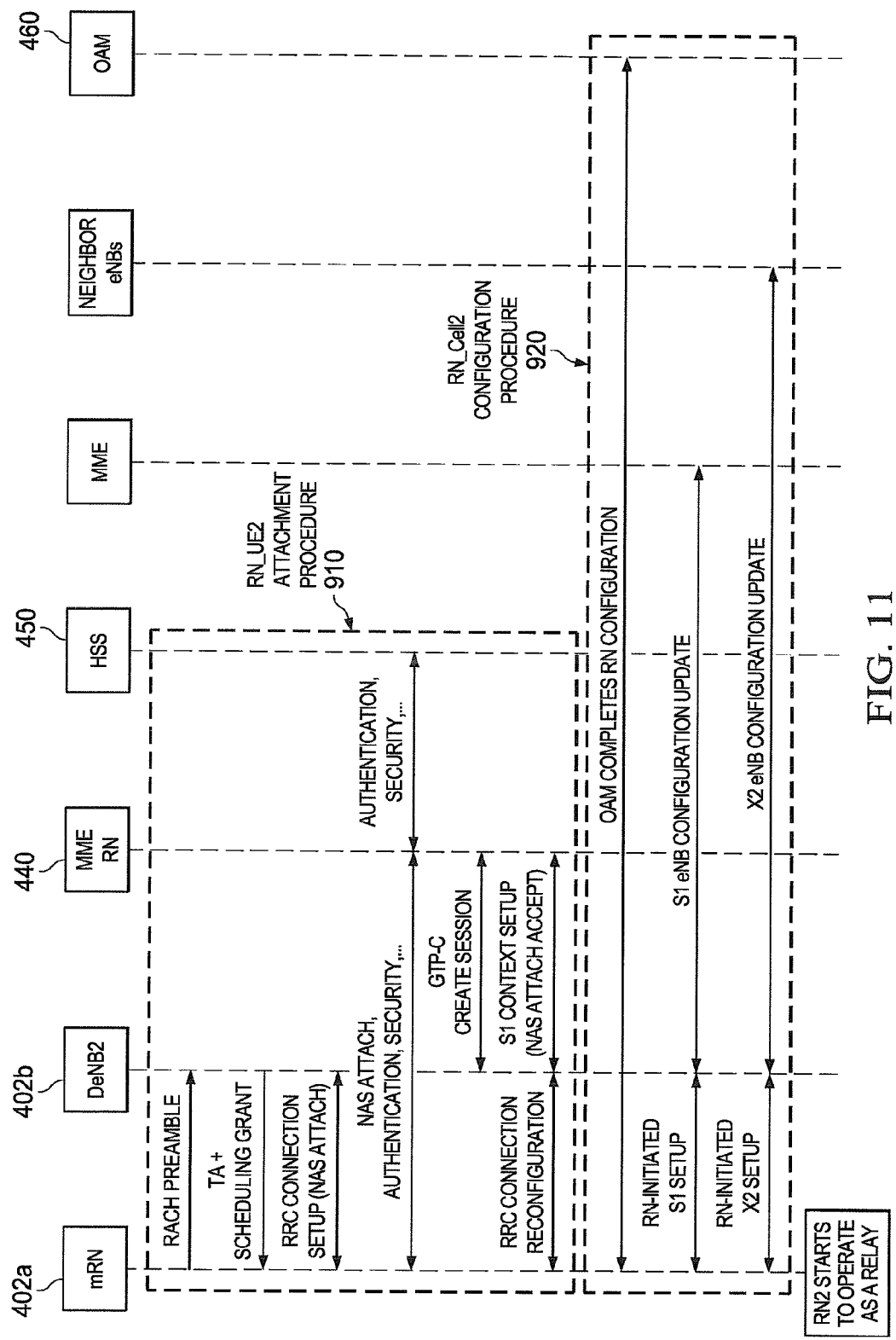
FIG. 11 depicts a more detailed messaging flow diagram that illustrates the relay node attachment and the relay node configuration procedures shown in FIG. 9A.

Turning to FIG. 11, there is provided a more detailed messaging flow diagram that illustrates the relay node attachment procedure 910 and the relay node configuration procedure 920 shown in FIG. 9A. It will be understood that these messaging flows and the procedures/processes they represent are conventional and are performed to create an RN_UE (connection to a DeNodeB) and an RN_Cell (connection to UEs). Thus, the specific message flows and functions illustrated in FIG. 11 will not be described in further detail herein.

Figure 8:
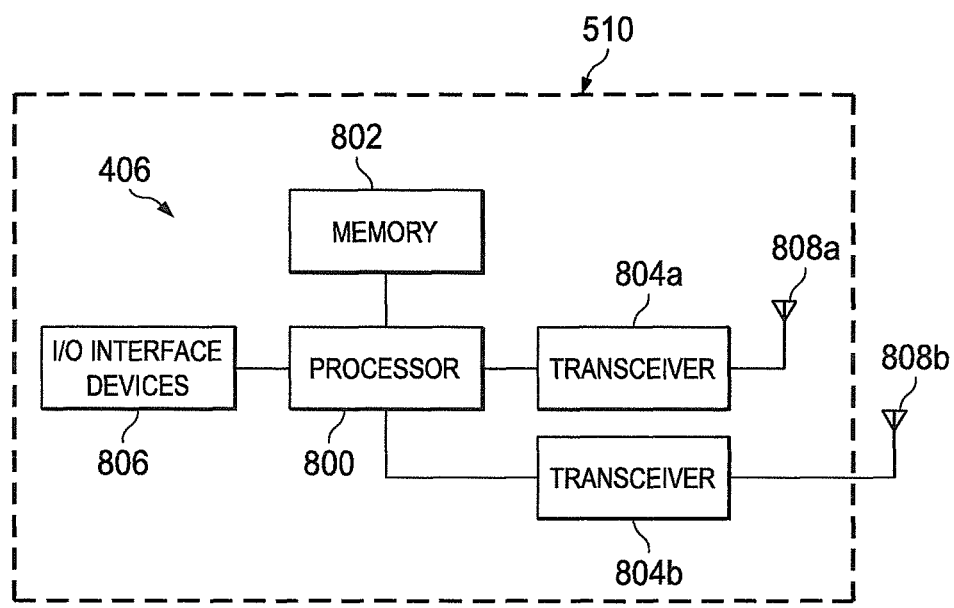
FIG. 8 is a block diagram of the mobile relay node in accordance with the present disclosure.

Now turning to FIG. 8, there is shown a block diagram of the mobile relay node 406 in accordance with the present disclosure. The mobile RN 406 includes a processor (which may include a digital signal processor) 800, a memory 802, a first transceiver 804a (RN_Cell), a second transceiver 804b (RN_UE), input/output devices 806, a first antenna 808a (for RN_Cell communication), and a second antenna 808b (for RN_UE communication). Other components may be included, but not shown. Details of the operation and structure of these components, except as necessary to illustrate the operations and methods described herein, have been omitted.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multi-homed mobile relay node handoff method, comprising:
    establishing a first communication link between a mobile relay node and a first base station, the mobile relay node fixed to a moving vehicle, and comprising,
        attaching the mobile relay node to the first base station, and
        configuring the mobile relay node to include a first cell recognizable to UEs as a first cell of the mobile relay node and a second cell recognizable to UEs as a second cell of the mobile relay node, wherein the first cell of the mobile relay node has a first coverage area at the vehicle and the second cell of the mobile relay node has a second coverage area at the vehicle;
    establishing a plurality of communication sessions via the first cell between the mobile relay node and a first group of UEs and a plurality of communication sessions via the second cell between the mobile relay node and a second group of UEs, the first and second group of UEs proximate the moving vehicle and moving at a substantially same velocity as the moving vehicle;
    establishing a second communication link between the mobile relay node and a second base station, comprising, attaching the mobile relay node to the second base station; and
    performing a hand off of the mobile relay node from the first base station to the second base station when the vehicle moves from a first area to a second area, comprising,
        performing a hand off of at least one UE with an established communication session with the first cell from the first cell to the second cell of the mobile relay node.

2. The method in accordance with claim 1 wherein the hand off of the mobile relay node further comprises:
    transmitting data received over the plurality of communications sessions over the first communications link;
    after establishing the second communication link, transferring the plurality of communication sessions to the second communication link; and
    after transferring all of the plurality of communication sessions to the second communication link, releasing the first communication link.

3. The method in accordance with claim 1 further comprising:
    detecting a signal from the second base station; and
    performing the hand off when a strength of the signal meets a predetemiined threshold.

4. The method in accordance with claim 1 further comprising:
   transmitting on the first communication link at a first carrier frequency; and
   transmitting on the second communication link at a second carrier frequency different from the first carrier frequency.

5. A mobile relay node for use in a moving vehicle, the mobile relay node comprising:
   a processor;
   memory coupled to the processor;
   a transceiver coupled to the processor; and
   wherein the mobile relay node is configured to:
      establish a first communication link with a first base station, comprising:
         attach the mobile relay node to the first base station, and
         configure the mobile relay node to include a first cell recognizable to UEs as a first cell of the mobile relay node and a second cell recognizable to UEs as a second cell of the mobile relay node, wherein the first cell of the mobile relay node has a first coverage area at the vehicle and the second cell of the mobile relay node has a second coverage area at the vehicle,
      establish a plurality of communication sessions via the first cell with a first group of UEs and a plurality of communication sessions via the second cell with a second group of UEs, the first and second group of UEs disposed about the moving vehicle and moving at a substantially same velocity as the moving vehicle,
      transmit data received over the plurality of communications sessions over the first communications link;
      establish a second communication link with a second base station, comprising, attach the mobile relay node to the second base station, and
      handoff the mobile relay node from the first base station to the second base station when the vehicle moves from a first area to a second area, and thereafter transmit data received over the plurality of communication sessions over the second communications link, comprising, perform a hand off of at least one UE with an established communication session with the first cell from the first cell to the second cell of the mobile relay node.

6. The mobile relay node in accordance with claim 5 wherein the mobile relay node is further configured to:
   transmit data received over the plurality of communications sessions over the first communication link;
   after establishing the second communication link, transfer the plurality of communication sessions to the second communication link; and
   after transferring all of the plurality of communication sessions to the second communications link, release the first communication link.

7. The mobile relay node in accordance with claim 5 wherein the mobile relay node is further configured to:
   detect a signal from the second base station; and
   perform the hand off when a strength of the signal meets a predetermined threshold.

8. The mobile relay node in accordance with claim 5 wherein:
   to establish the first communication link, the mobile relay node is further configured to:
      attach the mobile relay node to the first base station, the mobile relay node recognizable as a first UE, and
      configure the mobile relay node to include a first cell recognizable to the plurality of UEs as a cell of the first base station capable of communications with the UEs; and
   to establish the second communications link, the mobile relay node is further configured to:
      attach the mobile relay node to the second base station, the mobile relay node recognizable as a cell of the second base station.

9. A handoff method for use in a wireless communications network, the method comprising:
   establishing a first communication link between a mobile relay node and a source donor evolved Node B (DeNB) device, the mobile relay node fixed to a moving vehicle;
   configuring the mobile relay node to include a first cell recognizable to wireless devices as a first cell of the mobile relay node and a second cell recognizable to wireless devices as a second cell of the mobile relay node, wherein the first cell of the mobile relay node has a first coverage area at the vehicle and the second cell of the mobile relay node has a second coverage area at the vehicle;
   establishing a plurality of communication sessions via the first cell between the mobile relay node and a first group of wireless devices and a plurality of communication sessions via the second cell between the mobile relay node and a second group of wireless devices, the first and second group of wireless devices proximate the moving vehicle and moving at a substantially same velocity as the moving vehicle;
   establishing a second communication link between the mobile relay node and a second base station; and
   performing a hand off of the mobile relay node from the first base station to the second base station when the vehicle moves from a first area to a second area, comprising, performing a hand off of at least one wireless device with an established communication session with the first cell from the first cell to the second cell of the mobile relay node.

10. The method in accordance claim 9 further comprising:
    transmitting data received over the plurality of communications sessions over the first communications link; and
    after performing the handoff, transmitting data received over the plurality of communication sessions over the second communications link.

* * * * *